Figure 1:
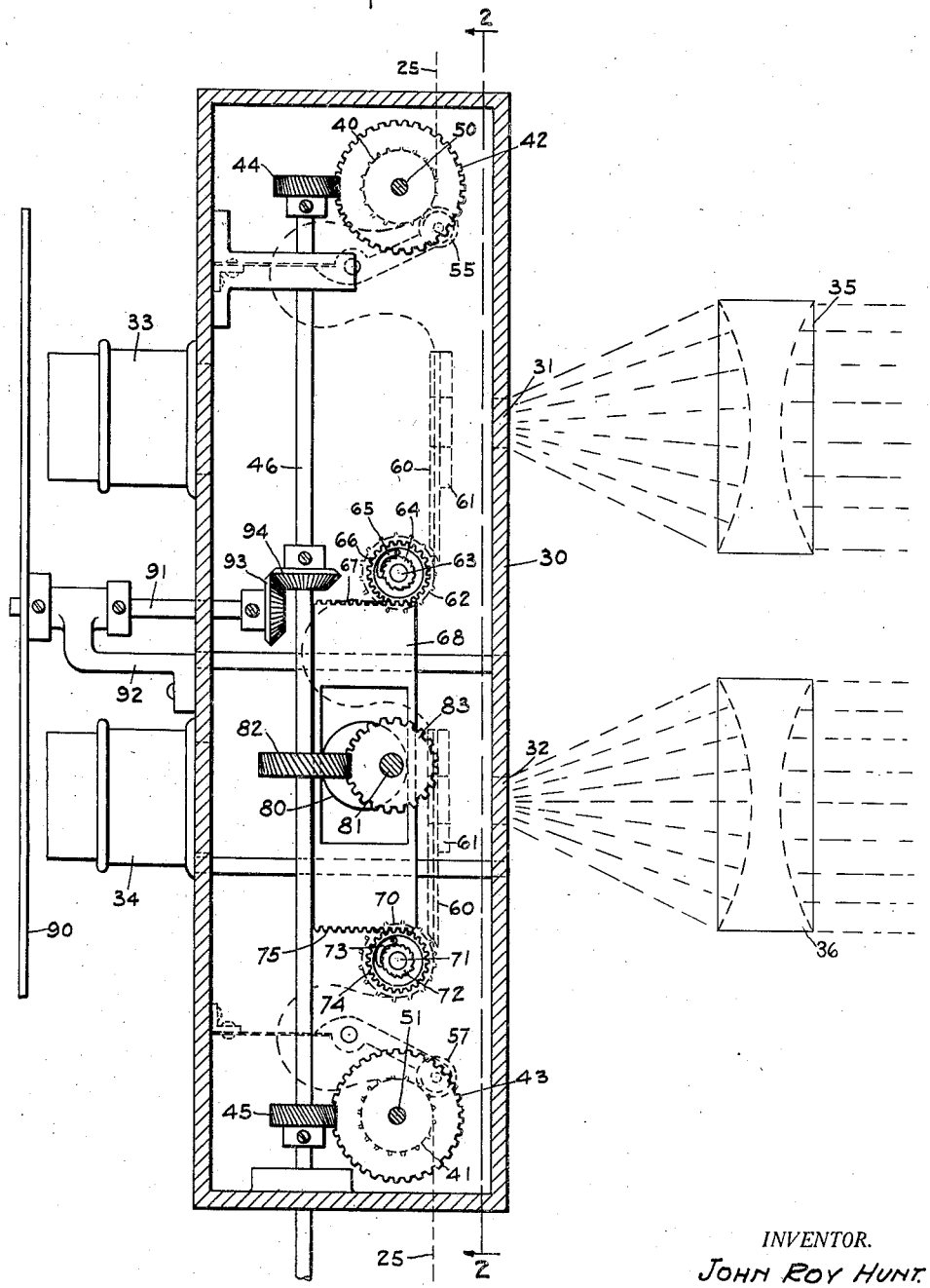

J. R. HUNT.
MOVING PICTURE PROJECTING MACHINE.
APPLICATION FILED FEB. 18, 1919.

1,320,860.

Patented Nov. 4, 1919.
4 SHEETS—SHEET 1.

INVENTOR.
JOHN ROY HUNT.
BY
ATTORNEYS.

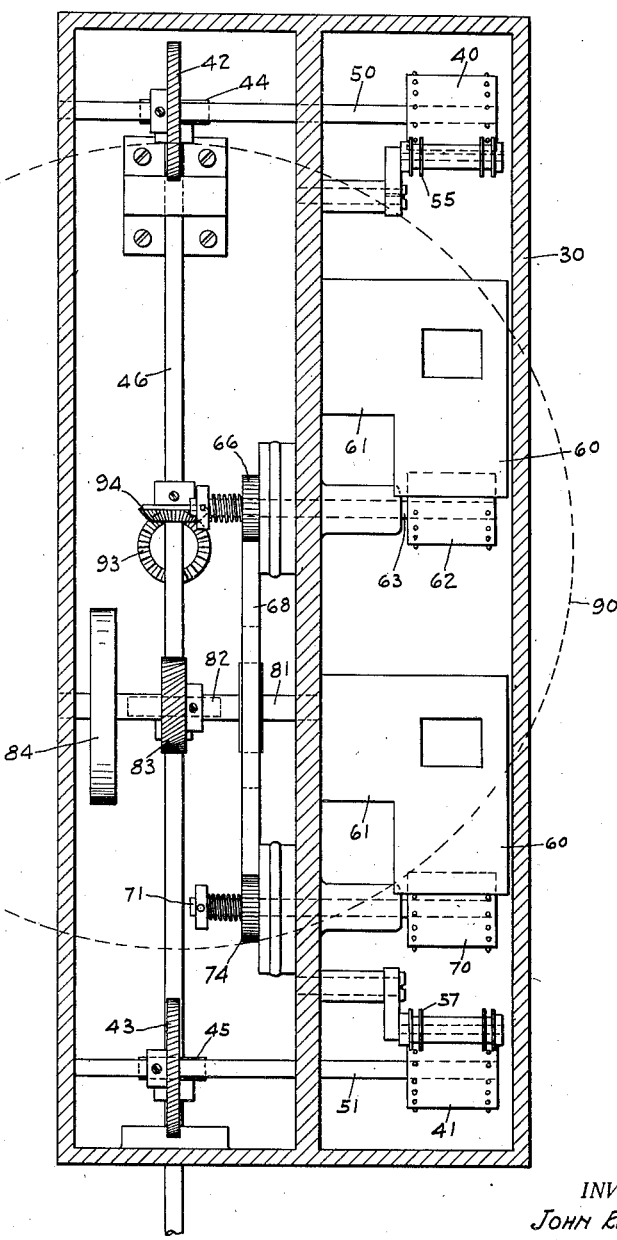

J. R. HUNT.
MOVING PICTURE PROJECTING MACHINE.
APPLICATION FILED FEB. 18, 1919.
1,320,860.
Patented Nov. 4, 1919.
4 SHEETS—SHEET 3.
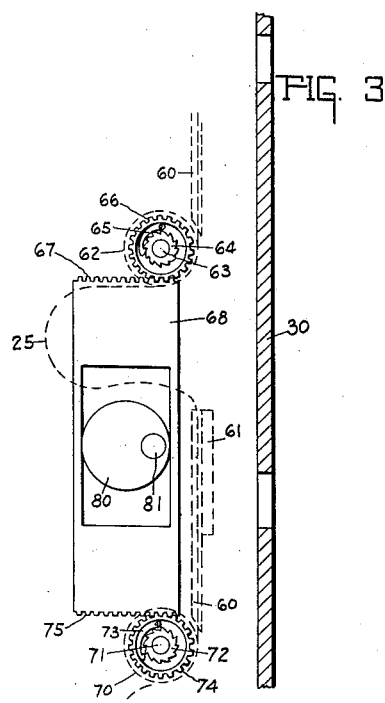
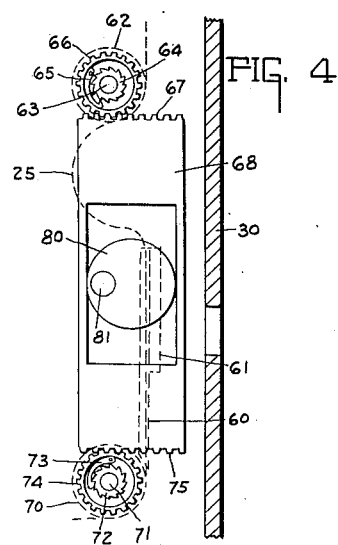
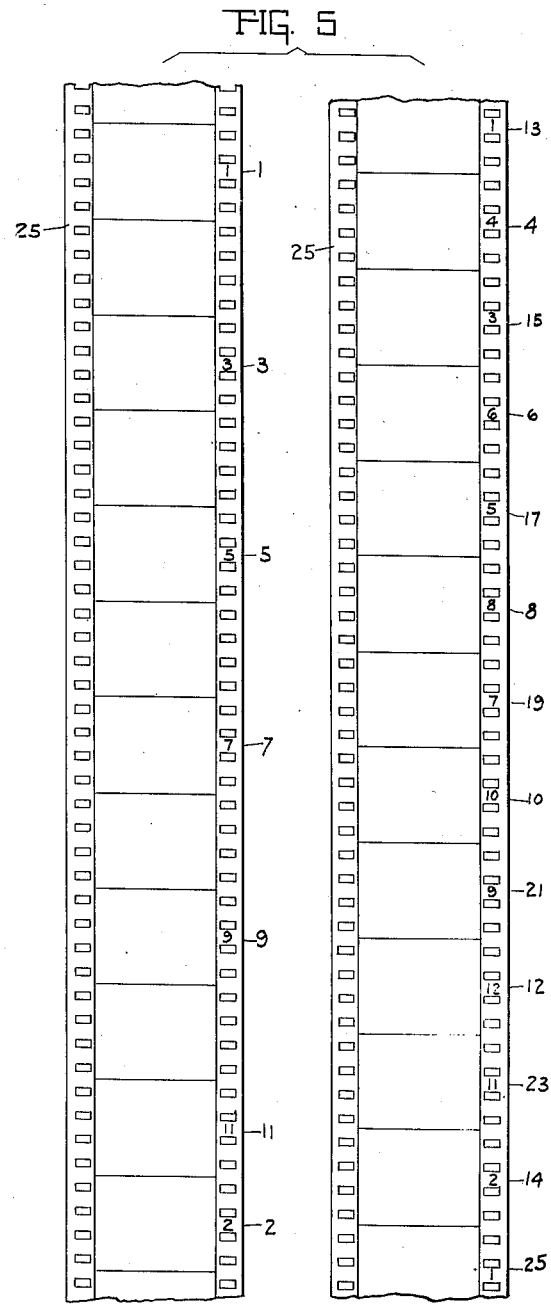
INVENTOR.
JOHN ROY HUNT.
BY
Lockwood & Lockwood
ATTORNEYS

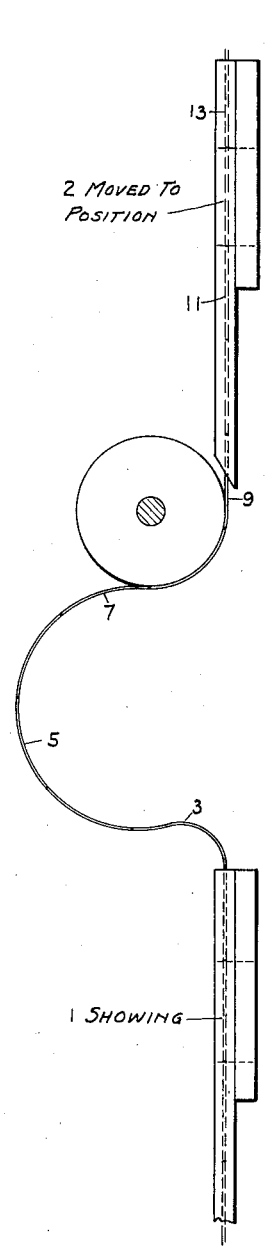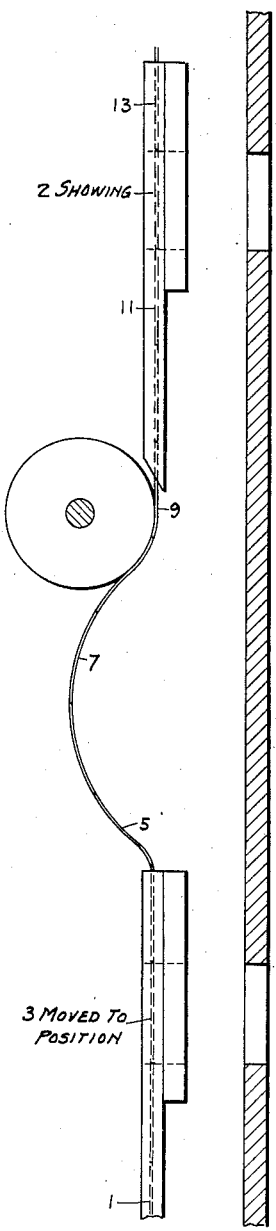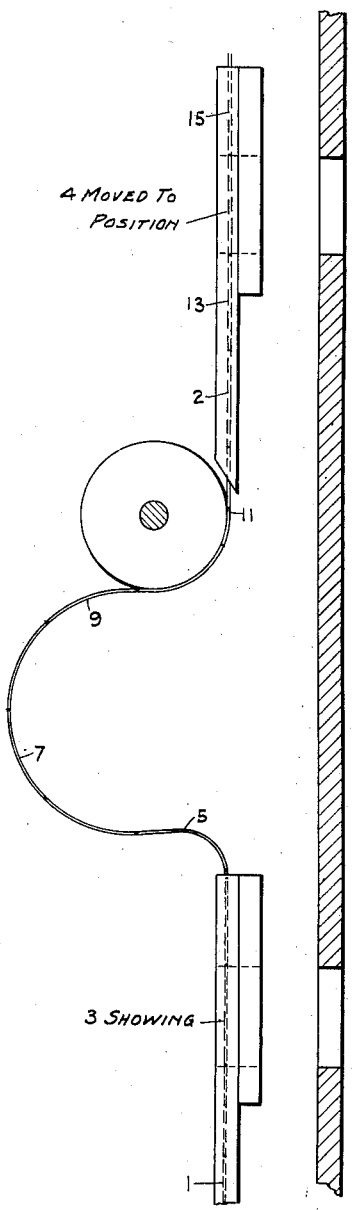

UNITED STATES PATENT OFFICE.

JOHN ROY HUNT, OF INDIANAPOLIS, INDIANA.

MOVING-PICTURE-PROJECTING MACHINE.

1,320,860.  Specification of Letters Patent.  Patented Nov. 4, 1919.

Application filed February 18, 1919. Serial No. 277,701.

*To all whom it may concern:*

Be it known that I, JOHN ROY HUNT, a citizen of the United States, and a resident of Indianapolis, county of Marion, and State of Indiana, have invented a certain new and useful Moving-Picture-Projecting Machine; and I do hereby declare that the following is a full, clear, and exact description thereof, reference being had to the accompanying drawings, in which like numerals refer to like parts.

The object of this invention is to project pictures upon a screen so that they will not flicker, but be steady and therefore not annoying to the audience, or injurious to the eyes.

Heretofore it has been necessary to cut off a light between the projection of successive pictures so that a dark period or partially unilluminated surface would appear upon the screen between the successive pictures, and on account of the operation of the shutter a flickering of the pictures results.

The chief feature of this invention consists in providing the projecting machine with a plurality of display apertures and feeding a properly formed film through the machine in such way that the picture can be brought up in a position in front of one aperture while the opposite picture is being projected from the other aperture, and while the first said picture is being projected from the first mentioned aperture the second picture will be removed, and the third picture brought into position. Therefore, with this invention the picture on the film is absolutely stationary while it is being projected and there is illumination all the time, as there is no dark or partially illuminated period. Also, because the picture is stationary all the time it is being projected it will appear absolutely steady on the screen, as much so as if projected from a slide in a lantern.

In order to utilize this sort of projecting machine, however, it is necessary to have a positive film to be made with the pictures out of their natural sequence in order that they may be successively projected from the apertures if there be more than two, or alternately projected if there be two.

Since the apertures must be spaced apart several inches, it is obviously necessary that two pictures in natural sequence would have to be located on the positive film several inches apart, that is as far apart as the distance between the display apertures in the projecting machine plus a proper allowance for slack in the film.

The full nature of this invention will be understood from the accompanying drawings and the following description and claims.

In the drawings Figure 1 is a vertical section through a projecting machine having two display apertures. Fig. 2 is a vertical section at right angles shown in Fig. 1 on line 2—2 thereof. Fig. 3 is a reproduction of a central portion of Fig. 1 with the parts in a changed position. Fig. 4 is the same with the parts in another position. Fig. 5 is a plan view of a positive film arranged for use in such machine. Fig. 6 is a diagrammatic view showing a vertical section of a portion of the aperture plate and diagram of the film when picture No. 1 is showing, and picture No. 2 has been brought into position to show. Fig. 7 is the same while No. 2 is showing and No. 1 is being moved from the projected position and No. 3 is being just moved into position. Fig. 8 is the same with No. 3 picture showing and No. 4 picture just moving to place.

As shown herein a positive film 25 (see Fig. 5) is printed with the pictures out of natural sequence. This may have been done from a negative in which the pictures are in natural sequence or it may be produced from a negative in which the pictures have been photographed in the same sequence as they appear in the film in Fig. 5. In said figures there are two series of pictures, one series being the odd numbered pictures of the negative and the other being the even numbered pictures on the negative. The odd numbered pictures 1—3—5—7—9—11 precede at the beginning of the film and the even numbered series are alternated with blanks. The even numbered series begin with the two pictures following the 11th picture, and thereafter, the two series alternate with each other, the second series being 2—4—6—8—10—12. These series of numbers are on the films and are repeated throughout the length thereof for the purpose of indicating to the operator of the machine how to place or adjust the film in the machine, regardless of whether the film begins at the beginning, or is broken and started at the middle. The numerals at the right hand side of the film, shown in Fig. 5, indicate the natural sequence of the pictures on the film—that is their sequence as they appear on the screen, and if the film was made from an ordinary negative it has a sequence of the pictures on such negative.

Referring now to the projecting machine for using such a film, there is shown a casing 30 having upper and lower light receiving apertures 31 and 32, through which light enters from the condenser 35 and 36, as is well understood. In front of each of said light apertures there is an aperture plate 60 and a presser gate 61 of the usual type. The pictures are projected through suitable lenses 33 and 34.

A single film 25 passes across both the upper and lower apertures as indicated in Fig. 1. There it passes over a feed sprocket 40 which is secured on a shaft 50, having on it a gear 42 that meshes with a release wheel 44 on the drive shaft 46 extending vertically through the machine. At the lower end of the machine there is also a take-up sprocket 41, on a shaft 51 carrying a gear 43 meshing with a release wheel 45 on shaft 46. There is nothing novel about this part of the mechanism nor to the tension rollers 55 and 57 and their mounting.

From the upper feeding sprocket the film 25 passes between the aperture plate 60 and presser gate 61 and thence is taken charge of by a new feeding apparatus peculiar to this invention. It passes from the feed sprocket 62 just below the upper aperture, and said sprocket is secured on a shaft 63 on which there is a ratchet wheel 64, driven in the feeding direction by a pawl 65, pivoted on the side of the loose gear 66 so that when said gear is moved in one direction it will feed the feeding sprocket 62, and when it is moved in the opposite direction it will simply ratchet. The gear 66 is driven by a rack 67 on the upper end of a rack plate 68. There is a similar feeding mechanism below the lower display aperture, consisting of a feed sprocket 70 on a shaft 71 carrying a ratchet wheel 72, which is driven in the feeding direction by a pawl 73 pivoted on a loose gear 74 which meshes with the rack 75 on the lower edge of the rack plate 68.

The operation of the feeding mechanism is as follows. When the rack plate 68 is moved to the right from the position shown in Fig. 1 or Fig. 3 it will operate and feed the lower feeding sprocket 70 until it reaches the position shown in Fig. 4. During that movement the upper feeding mechanism merely ratchets, but when the feed plate 68 moves to the left from the position shown in Fig. 4 to that shown in Figs. 1 and 3, the lower feeding mechanism ratchets idly and the upper feeding mechanism operates.

The rack plate 68 is actuated by a cam 80 which is secured on the shaft 81, (see Figs. 1 and 2). The cam operates in a rectangular opening in plate 68, its periphery engaging the plate on both sides of the opening and moving it to and fro. The shaft 81 is driven by the shaft 46 through the gears 82 and 83, and it also carries a fly wheel 84. The shutter 90 is mounted on the shaft 91 in front of the two lenses, and said shaft is carried in the bracket 92 and driven by the gears 93 and 94 on the shaft 46. This has a full semi-circular shutter so that each lens is obscured for the time, and when the lens is open until the picture has been brought fully into its position of exposure.

The operation of the machine can be explained by reference to Figs. 6, 7 and 8. The leader of the film has been drawn through the machine until the first picture is in the lower aperture, and the second picture has almost reached the upper aperture. The operation of the machine, while the first picture is showing through the lower aperture, moves the second picture in a position for the second aperture. The construction is such as to allow for the slack substantially shown in Fig. 6, between the two special feeding devices 62 and 70. While picture 1 is being shown it is absolutely stationary and is not moving, and therefore an absolutely stationary picture is projected on the screen. Then the lower feeding apparatus moves the lower end of the film from the position shown in Fig. 6 to that shown in Fig. 7, while the picture 2 is being shown at the upper aperture, and therefore, Fig. 2 is absolutely stationary while it is being shown, while Fig. 3 is moving into the aperture the shutter obscures it. This movement will reduce the slack as shown in Fig. 2. While Fig. 3 is being shown Fig. 4, or the next one of the second series, is projected on the face of the upper aperture, and this gives the same amount of slack to the film as is shown in Fig. 6. This operation is repeated, and it is observed that during no time does a picture and the film move while it is being projected, and during that time the other picture is being moved into projecting position, and as soon as one picture ceases to show the next picture begins to show. There is constant illumination and no darkened period of partial illumination, on the screen at any time, but the shutter causes one picture to dissolve out while the other picture develops into clear view.

The invention claimed is:

1. A projecting machine for motion pictures, including a plurality of display apertures over which one film is adapted to pass, a lens for each aperture, a feeding means near each aperture for giving the film feeding movement over said aperture, a separate gear and ratchet mechanism for driving each feeding means, and a rack plate between said gears having a rack on each end reciprocatory parallel with the axes of the lenses for engaging the gear for driving the corresponding feeding means, whereby when the plate is moved in one direction it will drive one feeding means, and when reversed it will drive the other feeding means.

2. A projecting machine for motion pictures, including a plurality of display apertures over which a film is adapted to pass, a lens for each aperture, a feeding means near each aperture for giving the film feeding movement over said aperture, a separate gear and ratchet mechanism for driving each feeding means, a rack plate between said gears each end of which is a rack reciprocatory parallel with the axes of the lenses for engaging the gear for driving the corresponding feeding means, whereby when the plate is moved in one direction it will drive one feeding means and when reversed will drive the other feeding means, and a rotatable cam for actuating said rack plate.

3. A projecting machine for motion pictures, including a plurality of display apertures over which a film is adapted to pass, a feeding means near each aperture for giving the film feeding movement over said aperture, a separate gear and ratchet mechanism for driving each feeding means, a horizontally reciprocatory rack plate between the feeding means having a rack in each end for engaging the gear for driving the corresponding feeding means, whereby when the plate is moved in one direction it will drive one feeding means, and when reversed will drive the other feeding means, said rack plate having an opening in it and a rotating eccentric operating in said opening and engaging the rack plate of the two sides of said opening for reciprocating the rack plate.

In witness whereof, I have hereunto affixed my signature.

JOHN ROY HUNT.